United States Patent
Franz et al.

(10) Patent No.: US 6,222,835 B1
(45) Date of Patent: Apr. 24, 2001

(54) METHOD AND CONFIGURATION FOR PACKET-ORIENTED DATA TRANSMISSION IN A DIGITAL TRANSMISSION SYSTEM

(75) Inventors: Volker Franz, Puchheim; Dieter Emmer, Starnberg, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/566,933

(22) Filed: May 8, 2000

Related U.S. Application Data

(63) Continuation of application No. PCT/DE98/03069, filed on Oct. 20, 1998.

(30) Foreign Application Priority Data

Nov. 6, 1997 (DE) .............................................. 197 49 148

(51) Int. Cl.$^7$ ...................................................... H04J 3/24
(52) U.S. Cl. .......................... 370/349; 714/748; 714/780
(58) Field of Search .................................... 370/337, 347, 370/349, 428, 465; 714/746, 748, 750, 780

(56) References Cited

U.S. PATENT DOCUMENTS

| | | | |
|---|---|---|---|
| 4,939,731 | * | 7/1990 | Reed et al. ............................ 714/748 |
| 5,954,839 | * | 9/1999 | Park et al. ............................ 714/699 |
| 5,983,382 | * | 11/1999 | Pauls .................................... 714/744 |

FOREIGN PATENT DOCUMENTS

| | | |
|---|---|---|
| 42 24 214 C2 | 2/1995 | (DE) . |
| 2 730 370 | 8/1996 | (FR) . |

OTHER PUBLICATIONS

"A Novel ARQ Technique using the Turbo Coding Principle" (Narayanan et al.), dated Mar. 1997, IEEE Communications Letters, vol. 1, No. 2, pp. 49–51, as mentioned on p. 1 of the specification.

"MAP Decoding for Satellite Channels" (Koorapaty et al.), dated Apr. 28, 1996, IEEE Communications, pp. 477–481.

"Code Combining—A Maximum–Likelihood Decoding Approach for Combining an Arbitrary Number of Noisy Packets" (Chase), dated May 1985, IEEE Transactions on Communications, vol. Com. 33, No. 5, pp. 385–393, as mentioned on p. 3 of the specification.

"Optimal Decoding of Linear Codes of Minimizing Symbol Error Rate" (Bahl et al.), pp. 284–287.

* cited by examiner

Primary Examiner—Chau Nguyen
Assistant Examiner—Dung Trinh
(74) Attorney, Agent, or Firm—Herbert L. Lerner; Laurence A. Greenberg; Werner H. Stemer

(57) ABSTRACT

In a process for transmitting data in a digital transmission system with a packet-switched service, an ARQ protocol and channel coding are used for minimizing errors with coders and decoders that supply "soft" information. When a data frame is transmitted again within the ARQ protocol, the information obtained by means of the channel decoder and ARQ protocol, that is, the "soft" information, is processed according to the coded bits together with the data frames transmitted again n+1 to N in data frame n (n= . . . N and n=number of data frames transmitted within the ARQ protocol). This process makes it possible to process the information obtained a priori during decoding of the data frame n+1 together with one or several data frames 1 to n. The device for implementing the process comprises an interleaver configured between the output of the decoder and the input of the equalizer, and a controller that directs the a priori information at the output of the coder to the equalizer via the interleaver when the data frame is rejected.

9 Claims, 3 Drawing Sheets

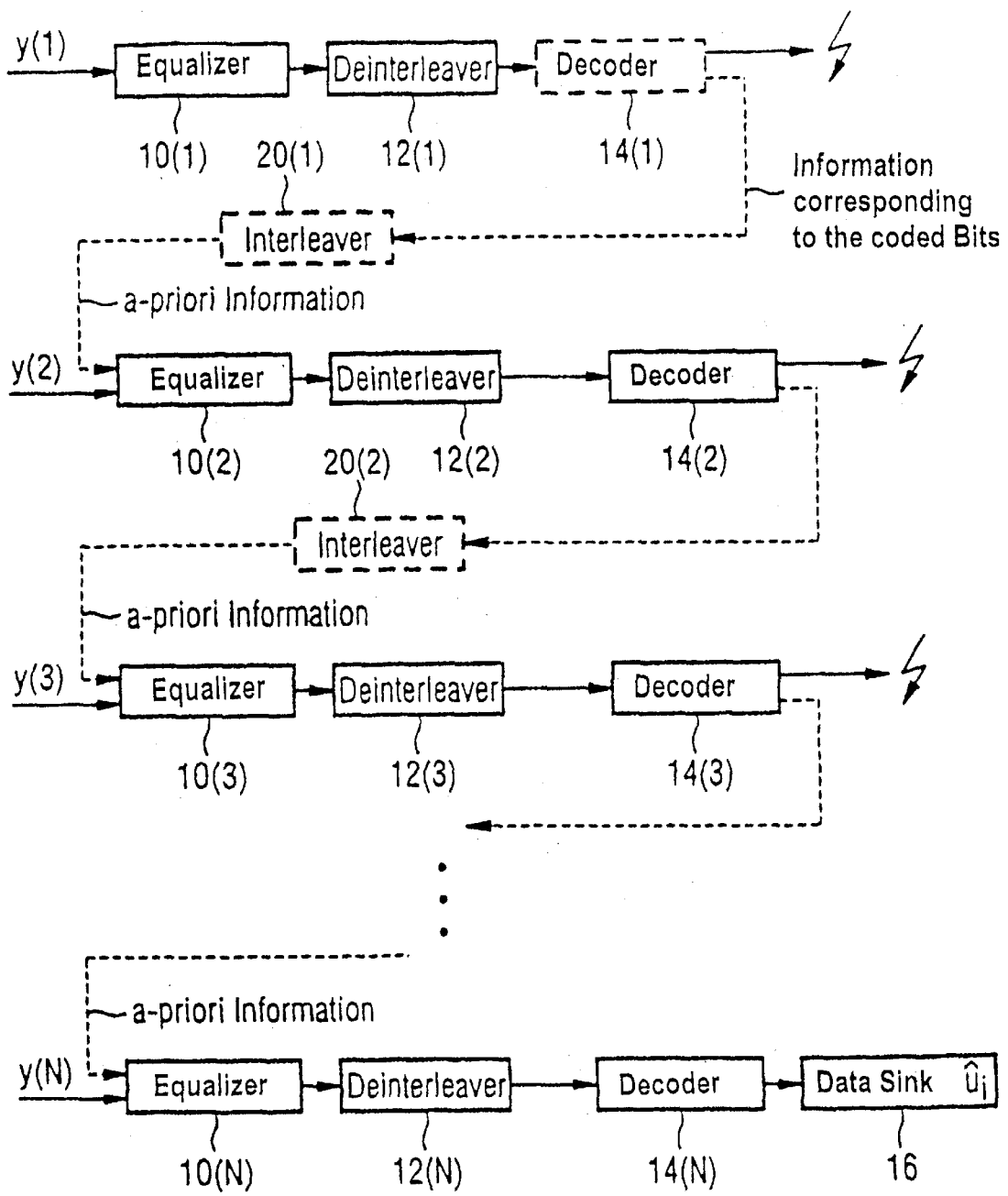

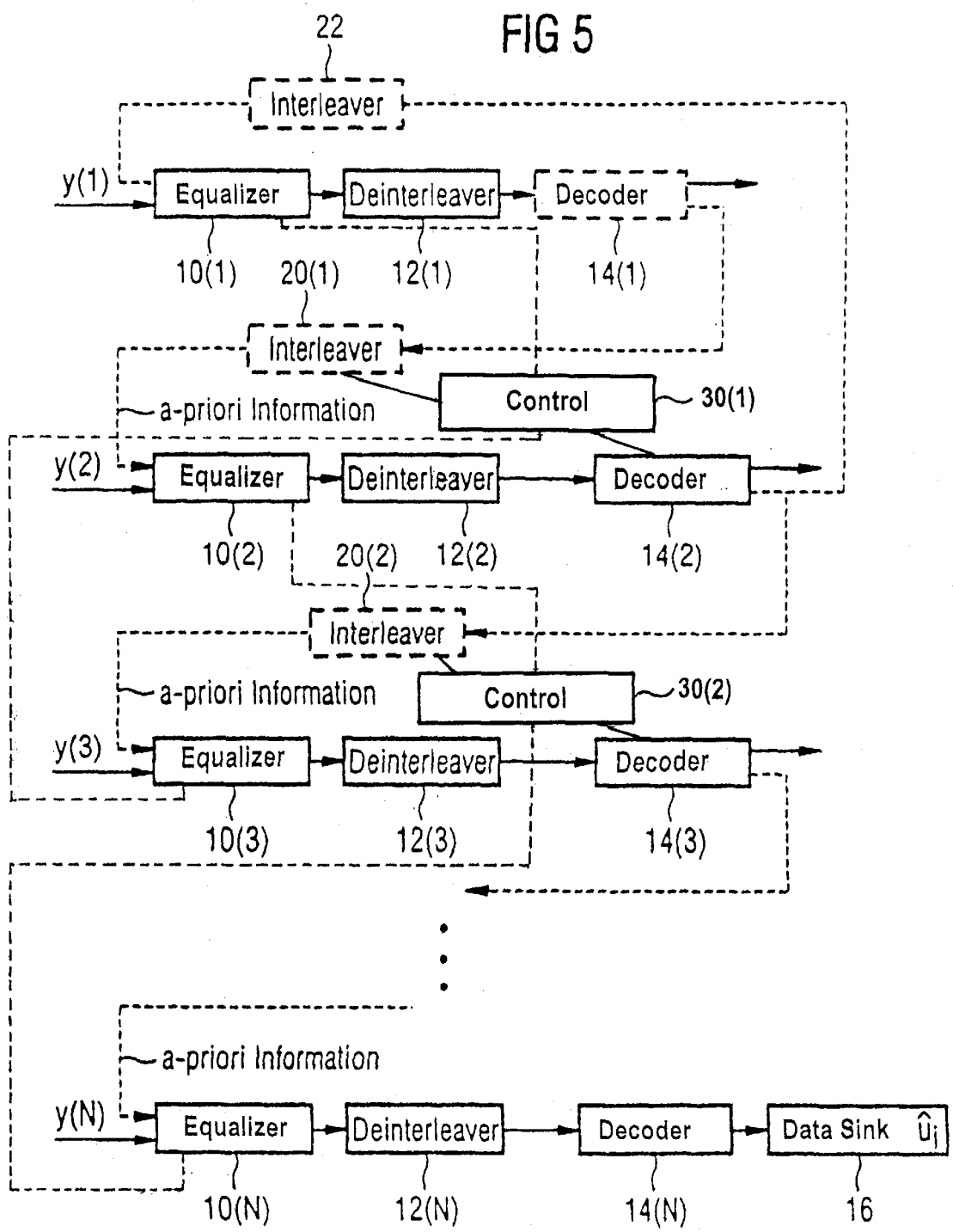

METHOD AND CONFIGURATION FOR PACKET-ORIENTED DATA TRANSMISSION IN A DIGITAL TRANSMISSION SYSTEM

CROSS-REFERENCE TO RELATED APPLICATION

This is a continuation of copending international application PCT/DE98/03069, filed Oct. 20, 1998, which designated the United States.

BACKGROUND OF THE INVENTION

FIELD OF THE INVENTION

The invention relates to a method for packet-oriented data transmission in a digital transmission system, in which an ARQ protocol and channel coding are used for error minimization with coders and decoders which emit soft information for evaluation of a retransmitted data frame, and to an configuration for performing the method.

A method and a configuration of the type mentioned initially are described in IEEE COMMUNICATIONS LETTERS, Volume 1, No. 2, pages 49–51, K. R. Narayanan et al., "A Novel ARQ Technique using the Turbo Coding Principle". According to the method described there, logarithmic likelihood ratios (LLR) for the data to be decoded are determined during an earlier attempt to decode data in a data frame. If a decoding attempt fails, then the corresponding data frame is retransmitted. When the data in the retransmitted data frame are being decoded, the logarithmic likelihood ratios determined during the earlier decoding attempt are used as a-priori information in a forward-progressing manner.

In a conventional transmission path for transmission and for reception of digital data, the data from a data source are combined into blocks and are fed to a convolution coder. The coded data blocks are encrypted in an interleaver and are then transmitted via an ISI channel (ISI=Intersymbol Interference). At the receiver end, the data blocks are equalized in an equalizer. Once the equalizer has removed the interference, the equalized data blocks are processed in a deinterleaver, and this emits the data blocks, after deinterleaving, to a decoder, which then corrects the majority of the errors and passes its output signals to the data sink.

The aim in such a system is to use the channel coding to correct the influence of those errors which occur in the ISI channel during transmission. The coding increases the bit rate, and all the arriving information is subjected to channel coding. Depending on which channel is used, various us coding methods are used, for example different coding versions are used for data transmission than for voice coding. Forward error correction (FEC) may be used for error correction in the physical layer, and error correction with the ARQ protocol may be used for layer 2, and these types of error correction lead to a transparent or nontransparent transmission class, respectively.

When error correction is carried out using the ARQ protocol (ARQ=Automatic Request for Retransmission), error correction is carried out deliberately for the data transmission. The ARQ method based on flow control leads to nontransparent transmission, and is particularly effective in conjunction with FEC. in the GSM system, ARQ is used in the RLP (RLP=Radiolink Protocol).

In ARQ protocols, data frames which, for example, are rejected during transmission are requested once again and are retransmitted. When the data are received once again, information which was generated when these data were previously received can be reused. The principle proposed for this purpose is known from IEEE Transactions on Communications, Volume COM-33, No. 5, May 1985, D. Chase, "Code Combining—A Maximum Likelihood Decoding Approach for Combining an Arbitrary Number of Noisy Packets". In this case, the information is transmitted in packets which are coded with a code having a relatively high code rate, and which are repeated in order to achieve reliable communication, if the redundancy in the code is not sufficient to overcome the channel interference problems. The receiver combines packets that are subject to noise signals, in order to obtain a packet at a code rate which is sufficiently low that even channels having extremely high error rates can be combined reliably. The aim is to combine a minimum number of packets to reduce the code rate and the delay to the minimum that is required to decode a predetermined packet (data frame). This is the classic code combining method, which is to be improved. Diversity methods, for example metric combining, are used.

SUMMARY OF THE INVENTION

It is accordingly an object of the invention to provide a method and a device for data transmission in a digital transmission system using a packet switching service which overcomes the herein afore-mentioned disadvantages of the heretofore-known methods and devices of this general type in such a way that the effort for processing retransmissions of data frames within an ARQ protocol is reduced, and the error correction is improved.

With the foregoing and other objects in view there is provided, in accordance with the invention, a method for packet-oriented data transmission in a digital transmission system that initially includes forming a first data frame by combining data. The first data frame is then coded, transmitted, and received. If an attempt to decode the received first data frame fails, an ARQ protocol is used to retransmit the first data frame. Specifically, a second data frame is transmitted that is essentially identical to the first data frame. The transmitted second data frame is received. Soft information and decoded data are produced from the received first data frame and from the received second data frame using decoders. The received second data frame is evaluated using the soft information obtained from the received first data frame as a-priori information. The received first data frame is evaluated using the soft information obtained from the received second data frame as a-priori information.

If it has been channel-coded, the data frame that is retransmitted in accordance with the ARQ protocol (i.e. the second data frame) has already been decoded once (i.e. the first data frame). During the decoding process, a-posteriori and extrinsic likelihoods are obtained for the coded bits. The extrinsic or a-posteriori likelihoods may be used as a-priori information or likelihoods for reception. A-priori information can thus be obtained via the channel decoder and the ARQ protocol, and the receiver processes the additional information together with the retransmitted data frame in a forward-progressing manner. In other words, the ARQ protocol allows information which the decoder has produced to be used as a-priori information for the equalization of the retransmitted data frames, even if metric combining according to the prior art is impossible because of the characteristic properties of the structures.

Furthermore, the soft information obtained during decoding of the data frame n+1 is processed in a backward-progressing manner with one or more of the data frames 1 to n. The previously transmitted data frames are thus combined with the extrinsic or a-posteriori information which has been obtained with the data frame n+1, enabling the data frame to be sufficiently free of errors such that it no longer need be retransmitted. In order to carry out the method according to the invention, the extrinsic information which has been obtained during the transmission of a data frame is thus used both for conditioning data frames which are transmitted later, and for conditioning data frames which have already been previously transmitted.

In accordance with an added mode of the invention, the method is carried out alternately in the forward-progressing and in the backward-progressing manner.

In accordance with an additional mode of the invention, the method is repeated until no retransmission within the ARQ protocol is requested.

In accordance with another mode of the invention, in order to limit the number of repetitions that a data frame is transmitted, the process is terminated after a predetermined number of repeated transmissions of the data frame.

In accordance with a further mode of the invention, the soft information that is processed in the equalizer is processed by using the soft information directly in the algorithm. This method has been proven in practice for the combination of transmitted data frames, and is thus also advantageous for the present invention.

DE 42 24 214 C2 discloses a method for source-controlled channel decoding by expansion of the Viterbi algorithm, in which case, in order to give preference to certain information bits, a number of states, for example states of data bits, are raised or lowered by means of a metric supplement, about which a-priori or a-posteriori information is available. In this case, the a-priori or a-posteriori information is used directly in the algorithm. This known patent specification can make no significant contribution to solving the problems of transmission with an ARQ protocol.

In accordance with a further added mode of the invention, the a-priori information in the equalizer is processed by means of a "symbol-by-symbol" MAP algorithm, resulting in greater flexibility in use of the method according to the invention.

A symbol-by-symbol MAP algorithm is known from the IEEE Transactions of Information Series, March 1974, "Optimal Decoding of Linear Codes for Minimal Simple Error Rate", L. R. Bahl, J. Cocke, F. Jelinek and J. Raviv. This deals with the general problem of estimating the a-posteriori likelihoods of the states and transitions of a Markov source which is observed by means of a discrete channel. The decoding of linear block and convolutional codes, in order to minimize symbol error likelihood, is discussed as a special case of this problem. This relates only to optimum decoding, however, and not to a correction method using an ARQ protocol, in order to allow the ARQ methods to be carried out with as little effort as possible.

In accordance with a further additional mode of the invention, of the information at the output of the decoder, only the extrinsic or a-posteriori information is used for further processing, with a satisfactory result being achieved with less effort required for combination of the signals.

In accordance with a concomitant mode of the invention, the method is particularly advantageous if it is used in the GSM system with the RLP protocol. Fundamentally, the invention is not limited to use with the GSM system, but is particularly advantageous in this context.

With the foregoing and other objects in view there is provided, in accordance with the invention, a configuration for carrying out the method. A coder is associated with a data source, and a first interleaver is connected downstream of the coder. An equalizer is connected via a channel to the first interleaver and the equalizer has an input. A decoder has an output providing soft information, and a deinterleaver is configured between the equalizer and the decoder. A second interleaver is configured between the output of the decoder and the input of the equalizer. A control device feeds the soft information to the equalizer and is coupled to the second interleaver.

In accordance with an added feature of the invention, the control device is coupled to a decoder n (n=1, . . . , N; where N=number of data frames transmitted using the ARQ protocol) and either to an equalizer n+1 or to one of the equalizers 1 to n−1.

Other features which are considered as characteristic for the invention are set forth in the appended claims.

Although the invention is illustrated and described herein as embodied in a method and configuration for packet-oriented data transmission in a digital transmission system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 shows a block diagram which illustrates the retransmission of a data frame for error correction purposes according to an embodiment of the invention; and FIG. 5 shows a block diagram which illustrates the multiple transmission of a data frame for error correction purposes according to a further exemplary embodiment.

DESCRIPTION OF THE PREFERRED EMBODIMENTS

Figure 1:
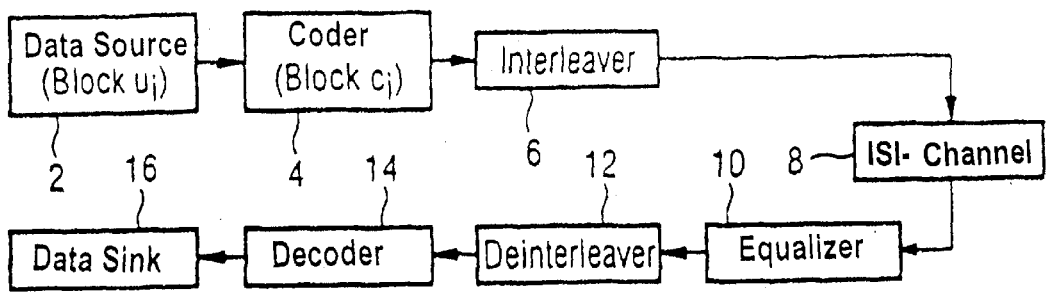
FIG. 1 shows a block diagram of a transmission path according to the prior art.

FIG. 1 shows a conventional transmission path for transmission and reception of digital data. The data are supplied from a data source 2, in the form of bits. These bits are combined into blocks $u_i$, and are fed to a coder which supplies coded blocks $c_i$. The coded data blocks $c_i$ are encrypted in an interleaver 6. After interleaving, the data blocks are then transmitted via an ISI channel 8, and are equalized in an equalizer 10. Once the equalizer 10 has removed the interference, it passes equalized data blocks to a deinterleaver 12 and, after deinterleaving, the data blocks are passed to a decoder 14, which then corrects the majority of errors and passes its output signals on to a data sink 16. This is the transmission and reception scheme to which the invention with the a-priori information detection and processing relates.

Figure 2:
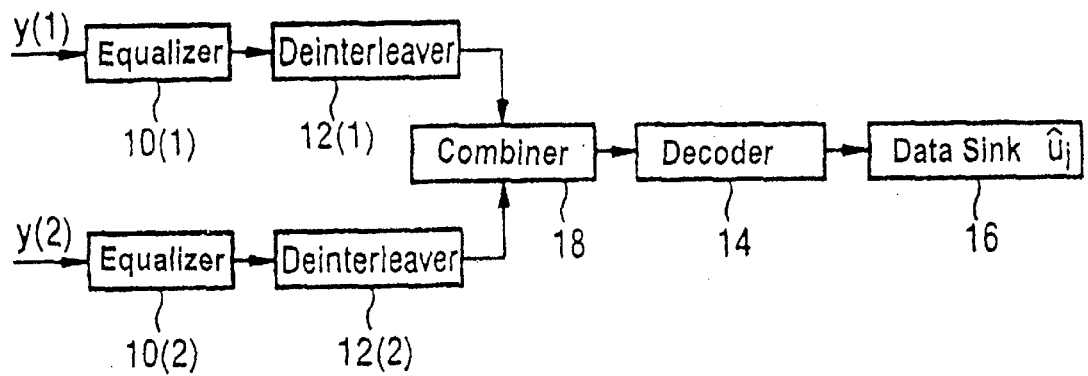
FIG. 2 shows a block diagram of the processing of a second transmitted data block using an ARQ protocol, according to the prior art.

FIG. 2 shows the situation according to the prior art, in which a data frame is transmitted twice using an ARQ protocol. The first transmitted data frame y (1) is fed to the equalizer 10 (1), and passes from there via the deinterleaver 12 (1) to a combiner 18. The signal y (2) of the data frame from the second transmission is fed to the equalizer 10 (2) and passes from there via the deinterleaver 12 (2) likewise to the combiner 18, where the two signals are combined. The output from the combiner 18 passes via the decoder 14 to the data sink, as a block $\hat{u}_i$. The combiner may be a device which operates according to DE 42 24 214 C2 or a device which carries out a combining process using a symbol-by-symbol MAP algorithm.

Figure 3:
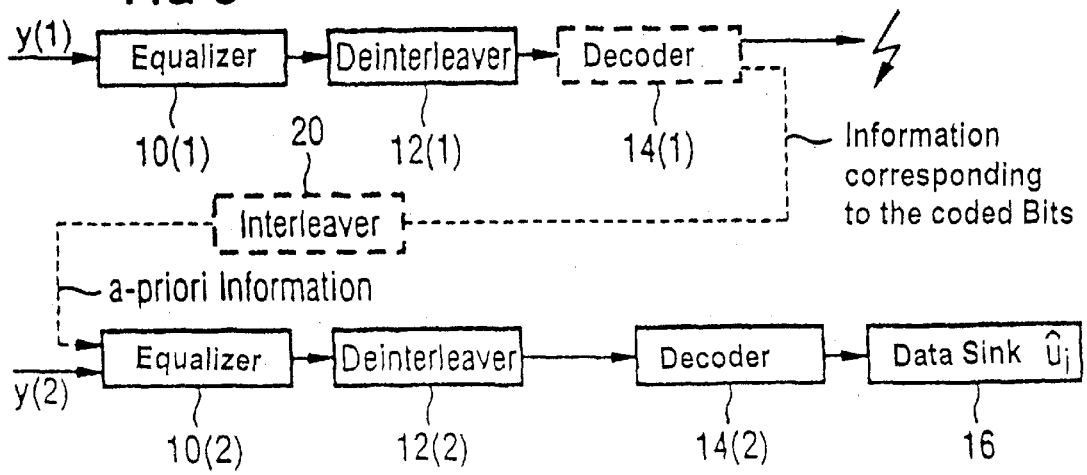
FIG. 3 shows a block diagram of the processing of a second transmitted data block using an ARQ protocol, according to an exemplary embodiment of the invention.

According to the block diagram in FIG. 3, which shows a first exemplary embodiment of the device according to the invention, the signal y (1) is fed to the equalizer 10 (1), from there to the deinterleaver 12 (1) and then to the decoder 14 (1). The signal at the output of the decoder 14 (1), with its soft or hard information, is rejected in this example, as is indicated by the arrow, so that, using the ARQ protocol, the data frame has to be retransmitted as a signal y (2), which is fed to the equalizer 10 (2). The information which is present at the output of the decoder 14 (1) and which corresponds to the coded bits is fed, via an interleaver 20 to the equalizer 10 (2) that is also supplied with the signal y (2). The equalizer 10 (2) processes the two signals and passes its output signal to the deinterleaver 12 (2), which emits the signals via the decoder 14 (2) to the data sink 16 for the signals $\hat{u}_i$.

As can be seen from the block diagram, the interleaver 20 is used to pass the information which is present at the output of the decoder 14 (1), as a-priori information, to the input of the equalizer 10 (2). In the exemplary embodiment shown in FIG. 3, the information passed from the decoder 14 (1) to the equalizer 10 (2) is the information which corresponds to the coded bits, with the soft information, that is to say the extrinsic or a-posteriori information of the equalizer 10 (2) is passed, after deinterleaving and decoding, to the data sink 16, where the signal is accepted and the ARQ is ended.

A If the data block is still rejected after the second transmission, the data block must be retransmitted. The scheme described above can then be duplicated so that the retransmissions are carried out until the decoded data blocks are accepted, or the ARQ protocol terminates after a predetermined number of retransmissions.

FIG. 4 illustrates a situation of multiple retransmission of a data block using the ARQ protocol. In this exemplary embodiment, the signal y (1), which corresponds to the first transmission of the data frame, is processed via the equalizer 10 (1), the deinterleaver 12 (1) and the decoder 14 (1), and is rejected, as is indicated by the arrow. The signal y (2), which corresponds to the second transmission of the data frame, is processed together with the output signal from the decoder 14 (1), which is fed via the interleaver 20 (1) to the equalizer 10 (2). The signal y (2) is further-processed via the deinterleaver 12 (2) and the decoder 14 (2), and is rejected. This principle continues until the signal y (N), which corresponds to the N-th transmission of the data frame, is transmitted. The output signal from the preceding decoder is fed as a-priori information to the equalizer 10 (N), and the output signal from the preceding decoder is processed together with the signal y (N). After being processed in the equalizer 10 (N), the signal y (N) passes via the deinterleaver 12 (N) to the decoder 14 (N), and once the output signal from the decoder 14 (N) has been accepted, to the data sink 16. Thus, in this exemplary embodiment, the signal of the retransmitted data frame is always processed together with the information at the output of the preceding decoder, which virtually corresponds to progressive processing.

FIG. 5 shows another exemplary embodiment of the invention in which case, as in FIG. 4, the signals y (n) where n=1, . . . , N, are processed progressively. However, FIG. 5 also shows the facility for the signal of a decoder, for example of the decoder 14 (2), to be fed back via an interleaver 22 to the equalizer 10 (1) which was responsible for the preceding signal y (1). A corresponding interleaver may then also be provided between the decoder 14 (3) and the equalizer 10 (2), and between the decoder 14 (N) and the equalizer 10 (N−1). Both forward-progressing and rearward-progressing processing are thus possible, by the signals at the output of the decoders being fed either to one of the following equalizers or to one of the preceding equalizers.

If the data frame of the n-th transmission is still rejected, the forward-progressing processing can be carried out once again, starting at the equalizer 10 (1), with the information of the decoder 14 (n) being used, via the interleaver 22, as a-priori information in the equalizer 10 (1). In this case, a check is carried out on each occasion to determine whether the data frame has been rejected. The forward-progressing processing can be repeated for as long as the data frame is incorrect. Termination after a fixed number of repetitions of the forward-progressing processing is also possible.

A control device 30 (n) [shown in FIG. 5, for example, for n=2 and 3] preferably feeds the soft information to the equalizer 10 (n−1) and is coupled to the interleaver 20(n−1). The control device 30 (n) is coupled to the decoder 14 (n) and can be coupled either to equalizer 10 (n−1) or to equalizer 10 (n+1), as shown in dashed lines.

The invention is not limited to the described exemplary embodiments. For example, the forward-progressing processing as well as the rearward-progressing processing can be carried out by using the output signals of a specific decoder for any desired version of the preceding or subsequent processing.

We claim:

1. A method for packet-oriented data transmission in a digital transmission system, which comprises:

forming a first data frame by combining data;

coding and transmitting the first data frame;

receiving the transmitted first data frame;

if an attempt to decode the received first data frame fails, using an ARQ protocol to transmit a second data frame that is essentially identical to the first data frame;

receiving the transmitted second data frame;

producing soft information and decoded data from the received first data frame and from the received second data frame using decoders;

evaluating the received second data frame using the soft information obtained from the received first data frame as a-priori information; and evaluating the received first data frame using the soft information obtained from the received second data frame as a-priori information.

2. The method according to claim 1, which comprises alternately using forward-progressing processing and rearward-progressing processing.

3. The method according to claim 1, which comprises repeating transmission of a data frame that is essentially identical to the first data frame, until a retransmission within the ARQ protocol is not requested.

4. The method according to claim 1, which comprises repeating transmission of a data frame that is essentially identical to the first data frame, until a predetermined number of transmissions have occurred.

5. The method according to claim 1, which comprises processing the a-priori information in an equalizer using a symbol-by-symbol MAP algorithm.

6. The method according to claim 1, which comprises, of information available at outputs of the decoders, further processing only extrinsic information.

7. The method according to claim 1, which comprises using a GSM system with a radio link process protocol to perform the defined steps.

8. A configuration for carrying out the method according to claim 1, comprising:

a coder associated with a data source;

a first interleaver connected downstream of said coder;

an equalizer connected via a channel to said first interleaver and having an input;

a decoder having an output providing soft information;

a deinterleaver configured between said equalizer and said decoder;

a second interleaver configured between said output of said decoder and said input of said equalizer; and a control device feeding the soft information to said equalizer being coupled to said second interleaver.

9. The configuration according to claim 8, wherein said control device is coupled to a decoder and to an equalizer.

* * * * *